(12) United States Patent
Bebchuk et al.

(10) Patent No.: US 10,437,791 B1
(45) Date of Patent: Oct. 8, 2019

(54) NETWORK BASED FILE STORAGE SYSTEM MONITOR

(71) Applicant: Code 42 Software, Inc., Minneapolis, MN (US)

(72) Inventors: Bradley Bebchuk, Minneapolis, MN (US); Peter Clark, Minneapolis, MN (US); Jeffrey Howie, Minneapolis, MN (US); Marc Everett Johnson, Minneapolis, MN (US); Samuel Lindsay-Levine, Minneapolis, MN (US); Erik Mainz, Minneapolis, MN (US); Peter Lindquist, Minneapolis, MN (US); Mitch Coopet, Minneapolis, MN (US)

(73) Assignee: Code 42 Software, Inc., Minneapolis, MN (US)

( * ) Notice: Subject to any disclaimer, the term of this patent is extended or adjusted under 35 U.S.C. 154(b) by 567 days.

(21) Appl. No.: 15/019,357

(22) Filed: Feb. 9, 2016

(51) Int. Cl.
*G06F 16/00* (2019.01)
*G06F 16/18* (2019.01)
*G06F 16/11* (2019.01)
*G06F 16/23* (2019.01)

(52) U.S. Cl.
CPC ........ *G06F 16/1873* (2019.01); *G06F 16/113* (2019.01); *G06F 16/2358* (2019.01)

(58) Field of Classification Search
CPC ........... G06F 17/3012; G06F 17/30073; G06F 11/1458
USPC .......................... 707/781, 821–822, 736–740
See application file for complete search history.

(56) References Cited

U.S. PATENT DOCUMENTS

| 7,925,658 | B2 * | 4/2011 | Colaco | G06F 17/30917 |
| | | | | 707/610 |
| 9,367,702 | B2 * | 6/2016 | Erofeev | G06F 21/6218 |
| 9,792,390 | B2 * | 10/2017 | Bause | H04N 21/23109 |
| 2006/0026220 | A1 * | 2/2006 | Margolus | G06F 16/2358 |

(Continued)

OTHER PUBLICATIONS

"CloudFuze 2.0 User Guide and Tutorial", [Online]. Retrieved from the Internet: <URL: https://www.cloudfuze.com/tutorial-2-0/>, (Accessed Dec. 21, 2015), 18 pgs.

(Continued)

*Primary Examiner* — Hanh B Thai
(74) *Attorney, Agent, or Firm* — Schwegman Lundberg & Woessner, P.A.

(57) ABSTRACT

Disclosed in some examples are methods, systems, and machine readable mediums which monitor, archive, and version file system elements stored in one or more different network based file storage systems for one or more different users. Any changes to file system elements stored in the network based file storage systems are recorded and versioned. The system may allow users to revert to a previous version of a file system element, recover a deleted file system element, and the system allows for audits to determine which users placed a file system element in which network based file storage systems and determine which users had access to the file system element in the network based file storage systems. As a result, the disclosed system improves the end-user experience by providing versioning and auditing capabilities as well as allowing organizations to monitor and control their digital property in network based file storage systems.

19 Claims, 7 Drawing Sheets

(56) References Cited

U.S. PATENT DOCUMENTS

| | | | |
|---|---|---|---|
| 2006/0101064 A1 | 5/2006 | Strong et al. | |
| 2007/0006321 A1* | 1/2007 | Bantz | G06F 21/6218 726/27 |
| 2008/0195827 A1* | 8/2008 | Saika | G06F 11/1458 711/162 |
| 2008/0282355 A1* | 11/2008 | Nemazi | G06F 17/3012 726/26 |
| 2009/0081998 A1* | 3/2009 | Ueno | G06F 21/10 455/414.3 |
| 2009/0125758 A1* | 5/2009 | Anuszczyk | G06F 8/70 714/48 |
| 2009/0287837 A1* | 11/2009 | Felsher | G06F 19/328 709/229 |
| 2010/0036872 A1* | 2/2010 | Hiraiwa | G06F 17/3012 707/E17.055 |
| 2010/0083057 A1* | 4/2010 | Laxminarayanan | G06F 16/1734 714/48 |
| 2011/0231458 A1* | 9/2011 | Sutoh | G06F 17/30082 707/827 |
| 2011/0231459 A1* | 9/2011 | Hiraiwa | G06F 17/3012 707/828 |
| 2013/0159021 A1* | 6/2013 | Felsher | G06F 19/328 705/3 |
| 2014/0006357 A1* | 1/2014 | Davis | G06F 11/1464 707/667 |
| 2014/0222866 A1* | 8/2014 | Joneja | G06F 17/30073 707/785 |
| 2014/0250157 A1* | 9/2014 | Sutoh | G06F 17/30082 707/827 |
| 2014/0372393 A1* | 12/2014 | Gosnell | G06F 21/6209 707/698 |
| 2015/0074056 A1* | 3/2015 | Kellner | G06F 16/113 707/640 |
| 2015/0134817 A1 | 5/2015 | Edwards | |
| 2015/0278028 A1* | 10/2015 | Patterson | G06F 17/00 707/639 |
| 2015/0350222 A1* | 12/2015 | Hashimoto | H04L 63/102 726/3 |
| 2016/0004708 A1* | 1/2016 | Takaoka | G06F 11/1458 707/667 |
| 2016/0092444 A1* | 3/2016 | Dornquast | G06F 16/178 707/625 |
| 2017/0255791 A1* | 9/2017 | Nam | G06F 21/00 |

OTHER PUBLICATIONS

"Ecm connector—CloudFuze", CloudFuze, [Online]. Retrieved from the Internet: <URL: https://www.cloudfuze.com/ecm-connector/>, (Accessed Dec. 21, 2015), 2 pgs.

"Manage multiple cloud drives, copy, move transfer filed across cloud storage services", MultiCloud, [Online]. Retrieved from the Internet: <URL: https://www.multcloud.com/product>, (Accessed Dec. 21, 2015), 4 pgs.

"Small & Medium Businesses—CloudFuze", CloudFuze, [Online]. Retrieved from the Internet: <URL: https://www.cloudfuze.com/product/>, (Accessed Dec. 21, 2015), 2 pgs.

* cited by examiner

NETWORK BASED FILE STORAGE SYSTEM MONITOR

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file system elements or records, but otherwise reserves all copyright rights whatsoever. The following notice applies to the software and data as described below and in the drawings that form a part of this document: Copyright Code42 Software, Inc., All Rights Reserved.

TECHNICAL FIELD

In some examples, embodiments pertain to computer implemented techniques of archiving, versioning, monitoring, and identifying usage patterns of file system elements (e.g., files) stored in one or more network based file storage systems.

BACKGROUND

Network based file storage systems allow users to store file system elements (e.g., files) at a datacenter accessible over a network (typically over a Wide Area Network). These systems are sometimes referred to as file hosting services, cloud storage services, online file storage providers, cyberlockers, file sharing services, and the like. Example network based file storage systems include DROPBOX®, BOX®, GOOGLE DRIVE, MICROSOFT ONEDRIVE®, and the like. These services allow users to create, edit, delete, or modify these file system elements. In some examples, these systems allow for users to store local copies of these file system elements on one or more devices for both faster access and access if the network connection is unavailable. Any changes made to either the local copies of the file system elements or the copy stored on the network based file storage system is replicated to all other copies. For example, a user may edit a local copy of a file system element on one device and the changes made may be automatically propagated to the copy on the network based file storage system and to other local copies saved on other devices. The network based file storage systems may also allow users to grant access to these file system elements to other users of the network based fife storage system according to permissions defined by the owner of the file system elements. This is called file system element sharing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
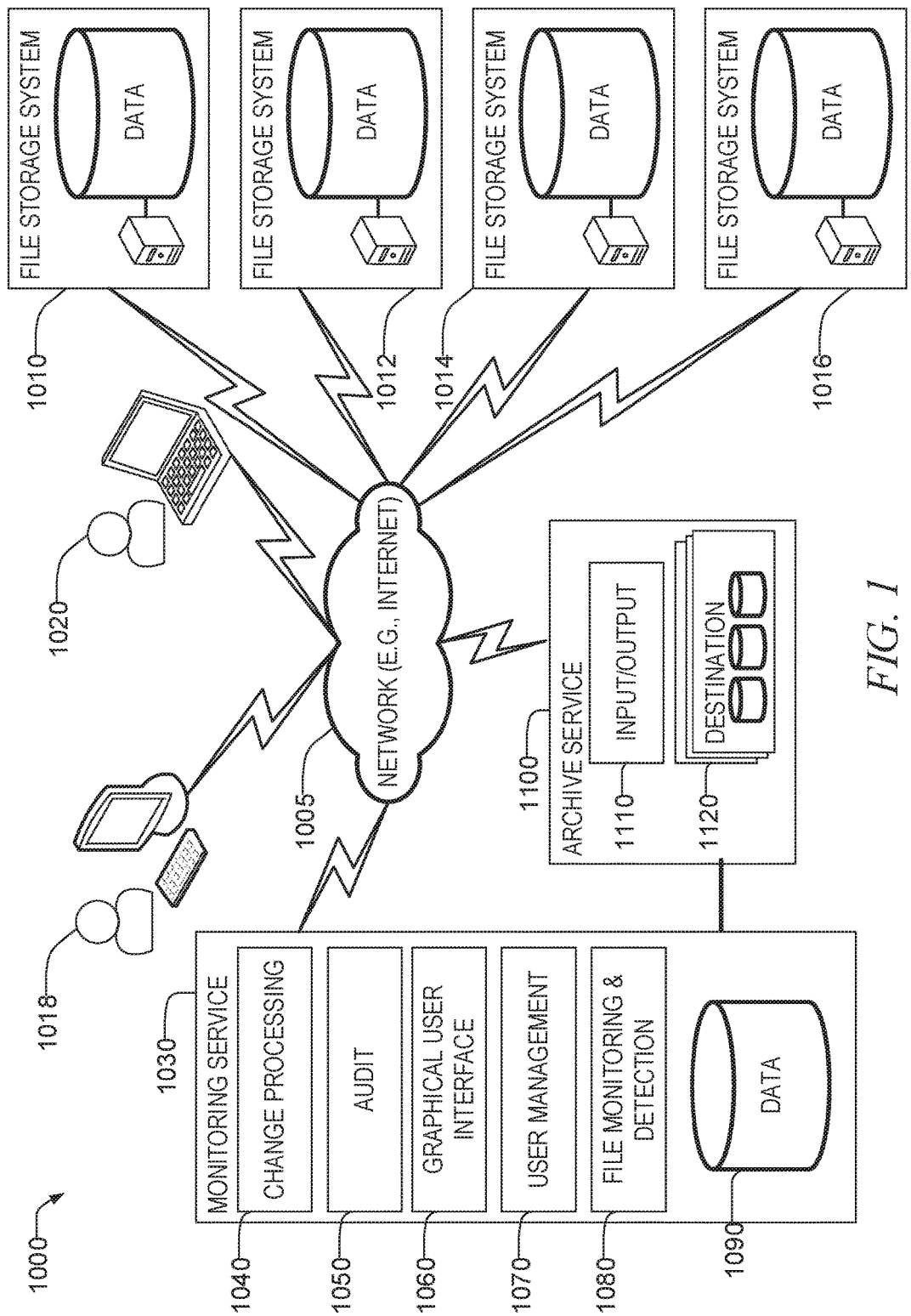
FIG. 1 is a schematic of a network based file storage system monitoring environment according to some examples of the present disclosure.

A recent phenomenon in corporate environments is called Bring your own device (BYOD) or Bring your own technology (BYOT) which refers to the commingling of employer-provided and employee-provided technology and devices. Users may use their own personal phones, computers, software programs, and other technology for both personal and work use. Likewise, they may utilize an employer-provided phone, computer, software program, and other technology for personal use.

As the popularity of network based file storage systems have grown, these systems have found use in corporate environments either as the result of a user using their own account with the network based file storage system for work related purposes, or an account with the network based file storage system may be setup for use by an employee for company business. Network based file storage systems provide easy ways to share file system elements with other users, work on file system elements across devices (e.g., from both home and work), and often they provide browser-based graphical user interfaces (GUI)s that allow users to access their file system elements from any browser. These network based file storage systems are powerful tools that have the potential to increase productivity of the workforce.

Along with these benefits comes increased risk. Company secrets and other sensitive data may be easily uploaded to these services and shared with outsiders who may leak this information. Unfortunately, with the proliferation of so many of these services, once a file system element has entered one of these services, a company typically cannot track the file system element. Thus once a file system element enters a network based file storage system, it is effectively out of the company's control. Additionally, while some network based file storage systems have versioning, some do not. Those with versioning often save only a limited number of versions. Version histories may be necessary for digital evidence preservation, auditing or the like. Additionally, version histories may be desirable for users to revert to an older version of a file system element at a later time.

Disclosed in some examples are methods, systems, and machine readable mediums which monitor, archive, and version file system elements (e.g., files, folders, directories, or the like) stored in one or more network based file storage systems for one or more users. File system elements stored in the network based file storage systems are archived in a storage system independent of the network based file storage systems. Any changes to file system elements stored in the network based file storage systems are recorded and versioned in the independent storage system. The system may allow users to revert to a previous version of a file system element and recover a deleted file system element. The system may also provide audits to determine which users placed a file system element in which network based file storage systems and determine which users had access to the file system element in the network based file storage systems. This system will improve the end-user experience by providing versioning and auditing capabilities as well as allow organizations to monitor and control their digital property across disparate network based file storage systems.

As used herein, a file system element is one of a directory (e.g., folder) or a file. File system elements can include metadata and content. For example, in the case of a directory, the metadata can include a name, path, creation date or time, modification date or time, deletion date or time, permissions, corresponding markers (e.g., icons), etc., and the content can include the files or directories contained within the directory. In the case of a file, the metadata can include all of the metadata described above for a directory and also include application affiliation (e.g., what application created the file, what application can read the file, etc), a file's fingerprint (such as a cryptographic hash of the file contents, and the content can include the bits of the file.

Turning now to FIG. 1, a network based file storage system monitoring environment 1000 is shown according to some examples of the present disclosure. Network based file storage systems 1010, 1012, 1014, and 1016 are accessible to computing devices of clients 1018 and 1020 through network 1005. Network 1005 may be a Wide Area Network (WAN) such as the Internet. Network based file storage systems 1010-1016 may be operated by a third party independently from the monitoring service 1030 and users 1018 and 1020. Monitoring service 1030 may monitor, archive, and version file system elements stored on one or more network based file storage systems (e.g., 1010-1016) for one or more users by interfacing between the network based file storage systems 1010-1016 and the archive service 1100.

User management component 1070 may provide one or more graphical user interfaces (GUIs) through graphical user interface (GUI) component 1060, which may allow users or organizational administrators to setup an account on the monitoring service 1030. This GUI may be provided to a user of an account on one of the network based file storage systems, or in other examples, the GUI may be provided to an administrator of an organization, and may allow the administrator to input information on behalf of individual users. Setting up an account includes providing information such as name, login information for the monitoring service 1030, a list of network based file storage systems they have accounts with, and the like. For administrators, the setup may also include identifying users in the organization that the monitoring service 1030 will monitor, and which network based file storage systems 1010-1016 they are registered with. Setup may also include providing credentials and/or authorization needed for the monitoring service 1030 to access accounts of the users that are to be monitored with the network based file storage systems 1010-1016.

In an example, each individual will input their credentials and/or authorization into the monitoring service 1030 (or with the individual network based file storage systems 1010-1016). In an example, the account with the network based file storage system may be a company account and an administrator may provide the credentials and authorization of the organization, which may serve as authorization for individual users with the network based file storage systems 1010-1016. In an example, the administrator may identify users and their contact information, and the user management component 1070 may send an electronic communication (e.g., email) to them requesting they provide authorization. Once users are registered, user registration data may be stored in the database 1090 along with information (e.g., an authorization token or access credentials) used to access the user's accounts on the network based file storage systems 1010-1016.

GUI component 1060 may provide or assist in providing one or more graphical user interfaces for inputting settings, providing authorization and/or credentials, performing audits, and the like. This GUI may be provided by a dedicated application (e.g., a user or administrator may download a dedicated application) using information provided by the monitoring service, or may be provided over network 1005 as a browser-based graphical user interface.

Change processing component 1040 may connect with one or more of the network based file storage systems 1010-1016 to download the file system elements stored by registered users from the network based file storage systems 1010-1016 and store them in an archive in the archive service 1100. Each user of the network based file storage systems 1010-1016 that is registered with the monitoring service 1030 may have an independent archive on the archive service 1100 for each file storage system 1010-1016 that the user has an account with that replicates all the user's files on that file storage system. In other examples, each user may have a single independent archive that stores all the user's files across all their network based file storage systems 1010-1016 that the user has an account with. In still yet other examples, all users of an organization may share the same archive on archive service 1100. In any case, metadata may be stored which describes which network based file storage system 1010-1016 stores which versions of which files in the archive.

Change processing component 1040 may also periodically connect with one or more of the network based file storage systems 1010-1016 to determine whether there are any changes to the file system elements stored by the network based file storage systems 1010-1016 for any of the registered users since the file system element was first stored or since the last update check. Change processing component 1040 may then store any changes in the corresponding archive in archive service 1100. The old version may be maintained in the archive and the new version may be stored alongside the old version along with metadata describing which user made the change, when the change was made, and other information about the change.

Change processing component 1040 may exchange information (e.g., request and receive change requests or download files) over network 1005 with the network based file storage systems 1010-1016 using one or more messages formatted according to an Application Programming interface (API) of the specific network based file storage system that is being accessed. The network based file storage systems 1010-1016 may be different from each other and may have different APIs. Each network based file storage system 1010-1016 may respond with information in a different format. Change processing component 1040 may be specifically programmed to work with one or more network based file storage systems.

For example, a particular network based file storage system 1010 may return the full file system element path and an indication of the change (e.g., modification, deletion, addition, and the like). In other examples, a particular network based file storage system 1010 may return a file system element name, a unique identifier of the file system element, and a unique identification of the parent of the file system element. Change processing component 1040 may convert the file system element path from a format specified by the network based file storage system to a file system element format supported by the archive service 1100 for versioning and archiving. For file system element changes, change processing component 1040 may download the new version of the file system elements and communicate the element to archive service 1100 along with metadata about the file system element. Metadata may include the file system element path (adjusted to be in the format of the archive service), the unique id of the file system element on the network based file storage system 1010-1016, which network based file storage system 1010-1016 the file system element is from, and the like. The archive service 1100 may then store the new version along with the old version. For file system element deletion, the change processing component 1040 may simply pass metadata indicating the file system element is deleted on the network based file storage system and the archive service 1100 may store the indication along with the file system element. For file system element moves, the change processing component may detect that the file system element has moved and then instruct the archive service 1100 to copy the file system element from the old location to the new location and mark the old location as moved. Note that this has the effect of creating a version of the directory (e.g., parent) of the file system element.

Change processing component 1040 may check for changes from the network based file storage systems 1010-1016 at predetermined intervals (e.g., every week, every day, every hour, every minute, and the like). The interval may be the same or different for each combination of particular user, particular network based file storage system, and the like. For example, one user may have their accounts with the network based file storage systems 1010-1016 checked every hour, whereas another, less active user may be checked every day. In another example, one user may have their account checked every hour for a first network based file storage system and have their account checked every week for a second network based file storage system, whereas another, less active user may be checked every day for the first network based file storage system. In other examples, rather than periodically poll the network based file storage system the change processing component 1040 may register for push notifications to be notified whenever a change is made. In these examples the list of changes may be sent as the push notification, or the push notification may instruct the change processing component 1040 to request the list of changes. In some examples, change processing component 1040 may receive push notifications for some network based file storage systems and poll other network based file storage systems.

These intervals may be determined by an administrator, the user, or may be determined based upon user activity on the network based file storage system. For example, the system may initially set the interval for checking for changes as a default value. After a predetermined number of update checks at the default interval, if the number of changes is above a threshold value, the system may shorten the interval. Likewise, if the number of file system elements that have changed is below a threshold value, the system may lengthen the interval. The interval may be continuously adjusted by monitoring the number of changes between the current interval and the last interval. In some examples, the interval may be as granular as a file system element level. For example, if the system determines that the number of changes to a file system element over an interval is above a predetermined threshold, then the interval for the file system element may be increased to capture and version more changes.

Audit component 1050 may provide one or more GUIs through GUI component 1060 to provide for user interfaces to allow users to access previous file system element versions, see the contents of their accounts in each network based file storage system 1010-1016, move file system elements between network based file storage systems 1010-1016 and the like. In order to display and see different versions of the file system elements, the audit component 1050 may contact the archive service 1100 to determine the various available versions of a particular file system element or file system elements. Audit component 1050 may then allow a user to download a copy of a particular version.

Audit component 1050 may also allow for a user or an organizational administrator to search for file system elements stored in one or more of the network based file storage systems 1010-1016. The user may specify that the search be conducted in a single user's account on one or more of the network based file storage systems 1010-1016, or may be for a group of user's accounts on one or more of the network based file storage systems 1010-1016, or for all users under the control of an administrator in the network based file storage systems 1010-1016. The search may be conducted on the basis of a number of search criteria supplied by the user including a file system element name (e.g., filename), version, a network based file storage system, a time frame, metadata, file system element content portions, a file system element fingerprint, or the like. The audit component 1050 may contact the archive service 1100 and ask the archive service 1100 to search for file system elements matching the search criteria in one or more of the archives. For example, the search may specify that the administrator is looking for all file system elements that are titled "presentation.ppt" that were stored on DROPBOX® by users that are in a management group in January of 2015. Audit component 1050 and GUI component 1060 may then provide the results in a GUI for the user or administrator.

Audit component 1050 may also implement a legal hold on file system elements. This allows organizations to enforce legal holds when the file system elements that are responsive to a legal inquiry may be stored on a network based file storage system. The legal hold may extend to one or more file system elements matching search criteria across one or more users on one or more network based file storage systems 1010-1016. The audit component 1050 may create an archive on the archive service 1100 specific to the legal hold. In other examples, the audit component may not create a specific legal hold archive, but may instruct the archive service to flag responsive file system elements as elements that are not to be deleted from the archive until the legal hold flag is cleared by an authorized individual. In still other examples, the archive service 1100 may do both and move the archive to a dedicated legal hold destination node in the plurality of destination nodes 1120 to increase the level of protection should a failure occur on the archive service 1100.

Audit component 1050 may also track file system elements. For example, an organizational administrator, author, or other user of a file system element may identify a file system element as a file system element to be tracked. This may be performed using a GUI of the monitoring service 1030 or may be performed as metadata associated with the file system element. In the case that the metadata is associated with the file system element, the monitoring service 1030 may scan the metadata upon downloading a file system element from the network based file storage system 1010-1016 and may add this file system element to a list of file system elements to be tracked. Tracked file system elements may be fingerprinted to avoid schemes to hide the file system element. Each time a change is registered for a fingerprinted file system element, the change may be logged. The log may be displayed in a GUI provided by the audit component 1050 in association with the GUI component 1060. In some examples, should the file to be tracked exceed one or more preset parameters, the administrator may be notified. Preset parameters include the file being shared with one or more identified individuals or groups of individuals (e.g., unauthorized individuals), the file being modified, the file being deleted, the file being moved, or the like.

In some examples, the audit component 1050 may use fingerprinting to find or track file system elements. Example methods of fingerprinting a file include a cryptographic hash value and a Rabin fingerprinting algorithm. For searching operations, the user may submit a file system element which may be fingerprinted. The system then compares the fingerprint of the submitted file system element to the fingerprints of the file system elements in the system. The fingerprints of the file system elements in the system may be pre-calculated (e.g., when the file system element is stored in the archive service 1100) and stored as metadata with the file system element for faster searching. In some examples, the fingerprints may be supplied by the network file storage system via an API.

For tracking operations, when a file system element change occurs the fingerprint of the file system element is calculated and compared to fingerprints of file system elements on the track list. A database (e.g., such as database 1090) may be updated which contains the list of all users of a particular file system element and which network based file storage systems the file system element is located, and a description of the change. Upon request a user may be provided a GUI showing this information by audit component 1050 in conjunction with GUI component 1060.

As part of the tracking operation, file system elements may be associated with access permission lists. That is, only certain users may be authorized to store the file system element on certain network based file storage systems. In this case, the system may contact the network based file storage system and delete the file system element for any user with the file system element on a network based file storage system that is not authorized. In some examples, the user is notified that the file system element is deleted. In other examples, an administrator is notified that an unauthorized individual had access to a protected file system element. In some examples, the system may automatically attempt to determine which other user provided them the file system element. For example, through determining which user of the network based file storage system instructed the network based file storage system to share the file system element with the unauthorized individual. This information may be determined from an RPC call to the network based file storage system. In other examples, a fingerprint of the file system element may take into account metadata of the file system element such as the time the file system element was last accessed, change information, and the like. The system may calculate a fingerprint of the copy of the file system element of the unauthorized user and may search for any file system elements with matching fingerprints. The users whose copies of the file system element that match the fingerprint are the most likely candidates for the user that shared the file system element with the unauthorized user.

In addition to determining which users have a particular file system element and where they are stored, the audit component 1050 may provide in a GUI information about which users changed the file system element, what the changes were, and when the changes were made. The audit component 1050 may present a tree structure showing each version as a node and the various branches depicting changes. Thus the original version of the file system element may be at the root and the second version is a child of the root node and the third version is either a child of the root or the second version depending on which version was used to create the third version.

Archive service 1100 may include data storage to store and version file system elements for users of the network-based network based file storage systems 1010-1016. One example archive service 1100 may be CRASHPLAN® from Code42 Software, Inc. based in Minneapolis Minn. Archive service 1100 may store each version of each file system element for each user for each network based file storage system 1010-1016. Thus, in an example, if user A stores file system element X in both network based file storage system 1010 and 1012, the archive service 1100 will store two copies of X in the archive, one for each network based file storage system. If user B stores file system element X in network based file storage system 1010, another copy of X will be stored for B, In some examples, file system elements may be compressed to save space, or only the changes from a previous version for each file system element may be stored. In other examples, file system elements may be de-duplicated such that the same file system element stored by multiple users or in multiple network based file storage systems may only be stored once with metadata indicating that each user has a copy.

Archive service 1100 may store the user file system elements from network based file storage systems 1010-1016 in one or more destination nodes 1120. Destination nodes may comprise a plurality of physical storage nodes. In some examples, destinations may be virtual, such as virtually scaled devices, such as may be hosted by one or more web services (such as AMAZON® WEB SERVICES—AWS). Destination nodes may be in geographically dispersed locations in order to provide redundancy and high availability. Additionally, archives may be replicated to another destination to ensure data protection. In some examples, the storage node and/or destination chosen for a particular archive may be chosen based upon computing system loads of the destination. Archive service may have an input/output component 1110 which may handle input and output requests, including requests to search one or more archives for a particular file system element; a particular content in a file system element, to store a file system element, to store a new version of a file system element, or the like. Input/Output component 1110 may have a queue to queue archive requests and queue responses.

In some examples, the archive service 1100 and the monitoring service 1030 may be communicatively coupled, either directly, or through a network (e.g., network 1005), In some examples, the archive service 1100 and the monitoring service 1030 may execute on one or more of the same computer hardware (e.g., a server).

Figure 2:
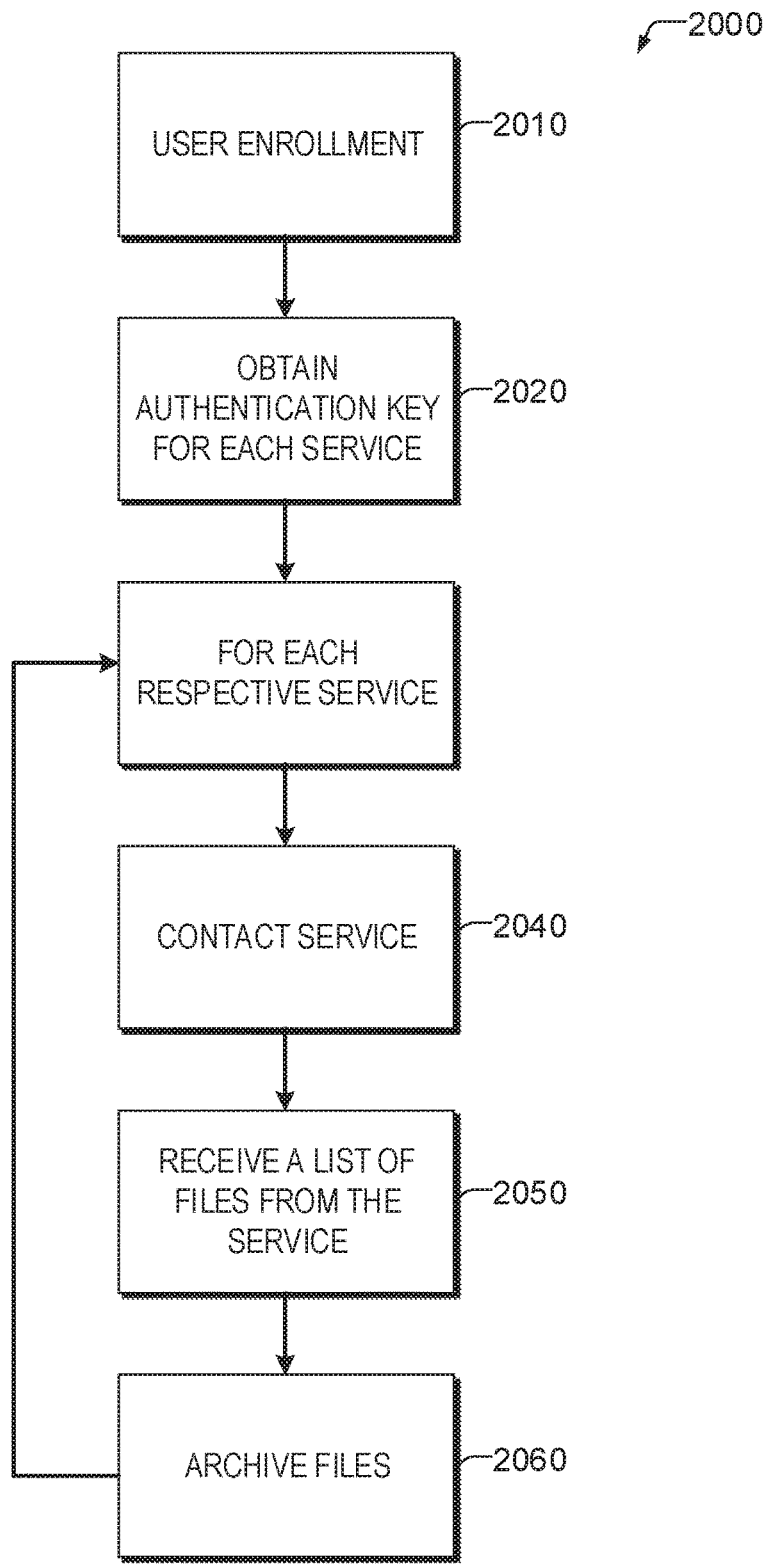
FIG. 2 is a flowchart of a method of registering for a monitoring service according to some examples of the present disclosure.

Turning now to FIG. 2, a flowchart of a method 2000 of registering for a monitoring service is shown according to some examples of the present disclosure. At operation 2010 the user enrolls in the monitoring service. As already noted this enrollment may be initiated by either individual users or an organization's administrator and this enrollment may be completed by the individual users (e.g., through a GUI) or completed by the administrators or partially by the administrators and partially by the individual users. For example, a GUI may ask users to identify which network based file storage systems they have accounts with and ask that they authenticate the monitoring service with those services by granting permission to access their accounts. This permission may be in the form of supplying a username and password or other authentication credential, or may be in the form of providing an authorization directly to the network based file storage system. In some examples, an authorization token is then provided to the monitoring service at operation 2020, which may be stored in a database. In some examples, the network based file storage systems may utilize an OAuth authentication protocol which may provide an access token in response to a user authorization. This token, or the authentication credentials (username and password) may be utilized to access the network based file storage systems.

Operations 2040-2060 may be performed for respective network based file storage systems identified in the enrollment and for which proper authentication and/or authorization was obtained. These operations may be performed in parallel across all the respective network based file storage systems, or in sequence. At operation 2040 the respective network based file storage system may be contacted and a list of file system elements for that user may be requested. At operation 2050 the monitoring service may receive the list of file system elements in the network based file system element storage service. In some examples, some network based file storage systems may first send a list of file system elements and the monitoring service may have to request the file system elements for download, but in other examples, the file system elements are sent by the network based file storage system in a single request-response message exchange. At operation 2060 the monitoring service may archive the file system elements in an archive. The archiving operation at operation 2060 may involve converting a file system element path format from a native format of the network based file storage system to a format native to the archive. One example conversion method is diagrammed in FIG. 5. Operations 2040-2060 are repeated for respective ones of the network based file storage systems identified in operation 2010. As already noted, these operations may be done in parallel or in sequence for each of the network based file storage systems. Once the user's file system elements are downloaded and archived, the monitoring service may periodically check with the network based file storage systems for changes.

Figure 3A:
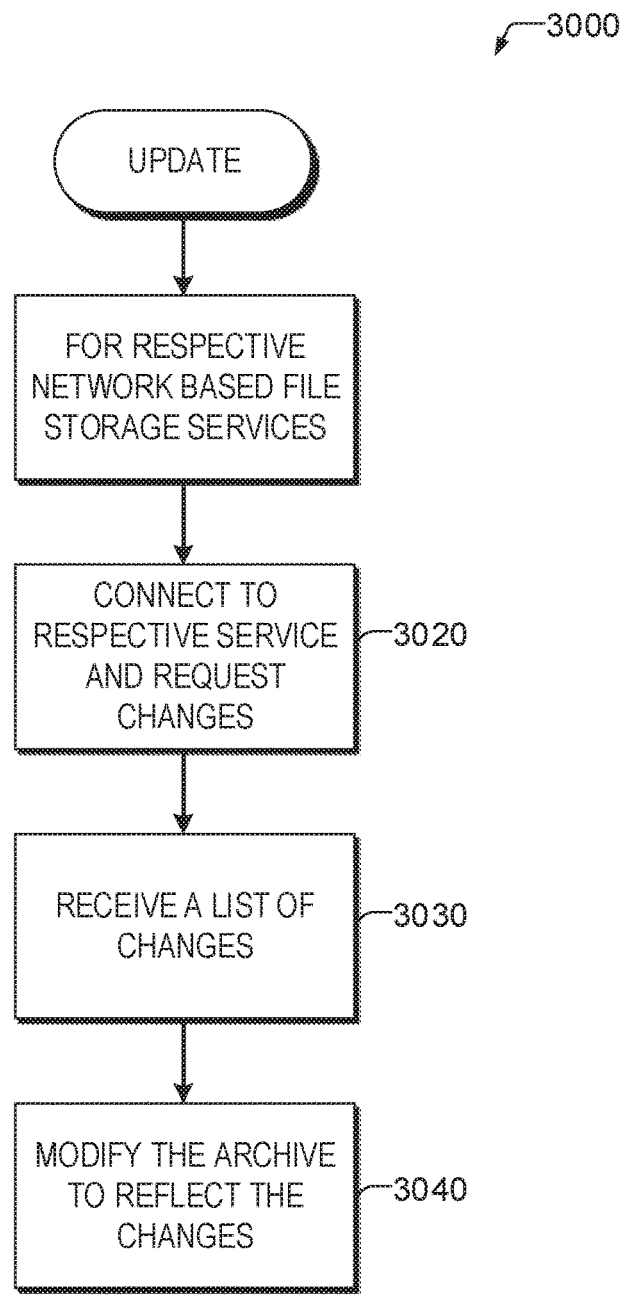
FIG. 3A is a flowchart of a method of checking for changes for a user according to some examples of the present disclosure.

Turning now to FIG. 3A, a flowchart of a method 3000 of checking for changes for a user is shown according to some examples of the present disclosure. The method of FIG. 3 may be performed for each user registered in the monitoring service. For respective ones (e.g., each) of the network based file storage systems that are associated with a user in the monitoring service, the system may periodically perform operations 3020-3040. At operation 3020, the monitoring service may connect with the network based file storage systems and request a list of changes to file system elements in the user's storage. The request may include a time since the last update check. The network based file storage system may respond with changes since the time included in the request.

At operation 3030 the network based file storage systems may send, and the monitoring service may receive a list of changes. In some examples, the system may convert a file path format of the updates to a file path format of the archive.

At operation 3040 the monitoring service may modify the archive to reflect the changes. For example, modified file system element may have the new version stored along with the old version of the file system element in the archive with metadata reflecting when the change was made, the version of the file system element, who made the change, and the like. A file system element deletion may or may not delete the file system element in the archive. In one example, it deletes the file system element in the archive, but in other examples, it is noted as deleted in the network based file storage system in metadata stored with the file system element, but not actually deleted from the archive. A file system element that is moved may be moved to a new location in the archive, or may be stored in both the new and old locations with metadata indicating it was moved. As already noted, in some examples, the new version may be downloaded from the network based file storage system (e.g., the new version is not sent with the list of changes at operation 3030).

Figure 3B:
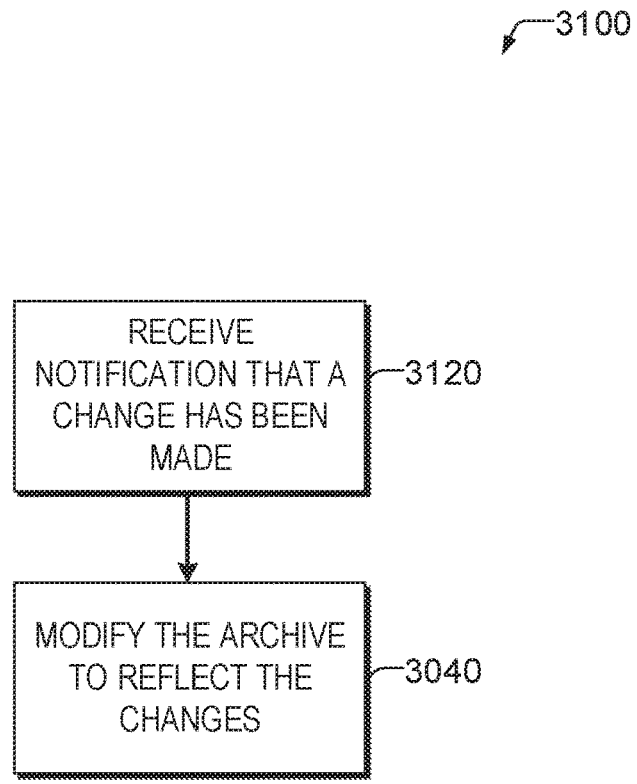
FIG. 3B is a flowchart of a method of receiving changes for a user according to some examples of the present disclosure.

Turning now to FIG. 3B, a flowchart of a method 3100 of receiving changes for a user is shown according to some examples of the present disclosure. The method of FIG. 3B shows the monitoring service handling changes communicated from a network based file storage system. For example, the monitoring service may register to receive a push notification when changes are made to the network based file storage system. These may be asynchronous events rather than the planned polling, as in FIG. 3A. At operation 3120 the monitoring service may receive a notification that a change has been made to a user's account on the network based file storage system. In some examples, the notification in operation 3120 may include the list of changes, but in other examples, the notification in operation 3120 may prompt the monitoring service to request the changes, which are then received. At operation 3040 the archive is modified, as in FIG. 3A with the changes. The monitoring service may periodically poll certain network based file storage systems and may receive push notifications for other network based file storage systems. For example, some network based file storage systems may not support push notifications on changes.

Figure 4:
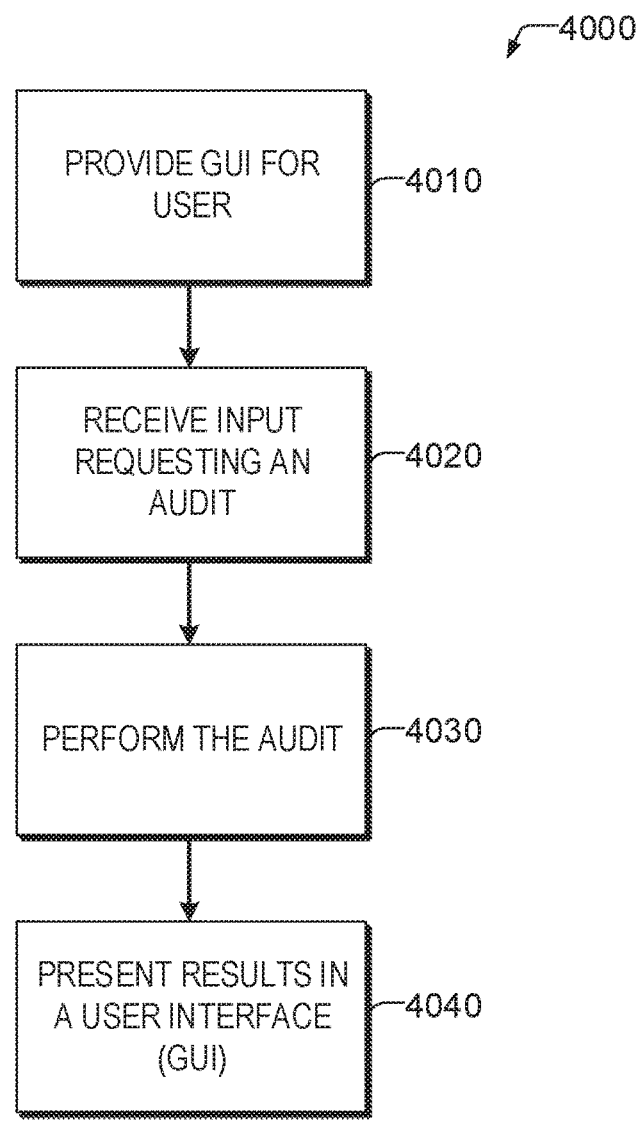
FIG. 4 is a flowchart of a method of performing an audit according to some examples of the present disclosure.

FIG. 4 shows a flowchart of a method 4000 of performing an audit according to some examples of the present disclosure. As used herein, auditing refers to operations to find, monitor, control, or track one or more file system elements on one or more network based file storage systems for one or more users. Example auditing operations include one or more of:

finding all instances of a particular file system element (based upon a file system element fingerprint, or other identifier) across one or more users and one or more network based file storage systems.

determining users that have access to the instances of a particular file system element on a network based file storage system.

deleting, renaming, modifying, or removing one or more file system elements from one or more users and one or more network based file storage systems.

viewing a list of who changed a particular file system element and view a list of versions and the differences between the versions for the particular file system element stored in a network based file storage system.

enabling a legal hold on one or more file system elements on the network based file storage system. The legal hold preserves these file system elements in a legal hold archive.

At operation 4010 the monitoring system may provide a Graphical User Interface (GUI) for the user. The user may be one of the monitored users with accounts on the network based file storage system or may be an administrator of an organization, or the like. The GUI may provide a listing of auditing options, as well as providing a list of users that the system is monitoring and their corresponding network based file storage systems. In some examples, the system may provide one GUI with one set of allowed auditing operations to a regular user, and another GUI with a second set of allowed auditing operations to an administrator. For example, the auditing operations available to the regular user may include viewing their file system elements and the various versions of the file system elements as well as restoring a previous version of a file system element, moving file system elements between network based file storage systems and the like. The auditing operations available to the administrator may include viewing file system elements for one or more users and the various versions of the file system elements as well as restoring a previous version of a file system element, moving file system elements between network based file storage systems, searching for files, enabling legal holds, determining which users have a particular file, and the like.

At operation 4020, the user selects, and the monitoring system receives an input requesting an audit. The input may include the type of audit requested, and other options, such as the user or group of users that are the target of the audit, the network based file storage systems to conduct the audit on, audit criteria (e.g., search criteria), and the like. In some examples, the target group may be set to "all users" to indicate an audit of all users. In other examples, users may be grouped into one or more groupings, such as "accounting," or "legal" to signify individuals who work in various groups of an organization.

In some examples, the search criteria may be one or more file system element characteristics, such as a file system element fingerprint to locate a specific file system element, a file system element name, file system element size, file system element type, file system element creation date, file system element modification date, or may include one or more content identifiers. Content identifiers may be any item of content such as a text phrase, an audio clip, a video clip, or the like. When a content identifier is specified in an audit, the monitoring system may search for file system elements that match the content identifier. For content identifiers that are text phrases, file system elements may be opened and searched for the text phrase using string matching algorithms. For content identifiers that are audio clips, file system elements may be opened and an audio fingerprint of the file system element may be compared to a fingerprint generated of a sample audio file submitted as the search criteria. Audio fingerprints may be generated by identifying frequencies of peak intensity on a spectrogram of an audio file. These frequencies of peak intensity may then be compared to the frequencies of peak intensity in the sample. For content identifiers that are video clips, file system elements may have a video fingerprint generated and compared to a fingerprint of a video clip submitted as the search criteria. Video fingerprints may be generated based upon key frame analysis, color, and motion changes during a video sequence. Matches may be fuzzy matches, such that an exact match is not needed, just a match that is close enough to a predetermined threshold. In some examples, the user may specify at operation 4020 how close a match needs to be to qualify as a match. For example, for text matching, the user may specify a predetermined maximum number of characters that may differ from the search string in the file for it to be considered a match.

At operation 4030, the monitoring system performs the audit. In some examples, the audit proceeds by searching the corresponding archives of the targeted users in the archive. Depending on the number of archives to be searched, system load, and other factors, the audit may be performed immediately, or scheduled to be run at a later time with the results saved for later display. For audits to find all instances of a particular file system element (based upon a file system element fingerprint) across one or more users and one or more network based file storage systems, the system searches the archive to find file system elements matching the file system element characteristic search criteria. The results may be the list of users and the network based file storage systems on which the users have stored the file system element. Metadata stored with the file system element (and obtained from the network based file storage systems) may identify users that have access to the instances of a particular file system element on a network based file storage system. This information may also be presented if requested.

For audits that seek to delete, rename, modify, or remove one or more file system elements from one or more users and one or more network based file storage systems, the system first finds users who have stored this file system element on one or more network based file storage systems. Once these file system element instances have been found, the desired operation is requested from the network based file storage systems (on behalf of each user in the audited user group).

For audits that seek to view a list of who changed a particular file system element and view a list of versions and the differences between the versions for the particular file system element stored in a network based file storage system, the system may first find users who have stored this file system element on one or more network based file storage systems and determine which other versions exist. The system may then display the versions of the file annotated with which users created which version and when. In some examples, the user may be presented with an option to see the changes between versions of the file system element.

For audits that enable a legal hold on one or more file system elements on the network based file storage system, the system may first find users who have stored this file system element on one or more network based file storage systems and then copy those file system elements to a legal hold archive, or may mark the file system elements to preserve them in the archive.

At operation 4040, results may be presented to the user in a graphical user interface. Results may be presented in a variety of formats and may represent the current state of the network based file storage system or their state at some point in the past. For example, users may be represented by one or more nodes in a graph like structure. File system elements shared between users may be represented by directed vertices. File system elements and their versions may be represented by a graph. The root of the graph represents the first known version of a file system element with branches signifying different evolutionary branches of the file system element. For example, if two users modified the file system element in different ways, each modification chain would be represented by its own branch. Other examples of ways the file system element may be represented may include text, tables, and the like.

As previously described, in some examples, the monitoring system may need to convert the file system element path from a format used by the network based file storage system into a format used by the monitoring system in the archive. The list of changes of some network based file storage systems returns a record for each file system element changed. The record may include the type of change (new file system element, delete, rename, changed, and the like), the file system element name, a unique identifier of the file system element, and the unique identifier of the file system element's parent. In some examples, the archive path is of a form that uses folder names, rather than unique identifiers. For example, a file system element may have a path on the archive of \programfile\newstuff\file.txt whereas the record returned by the network based file storage system may be [name:file.txt; id: 78999 parent:123456]. Id 123456 is the unique id of the \newstuff\ directory. Even if the monitoring system is aware that \newstuff\ has a unique id of 123456, it may not be known that newstuff is a subdirectory of programfile.

Figure 5:
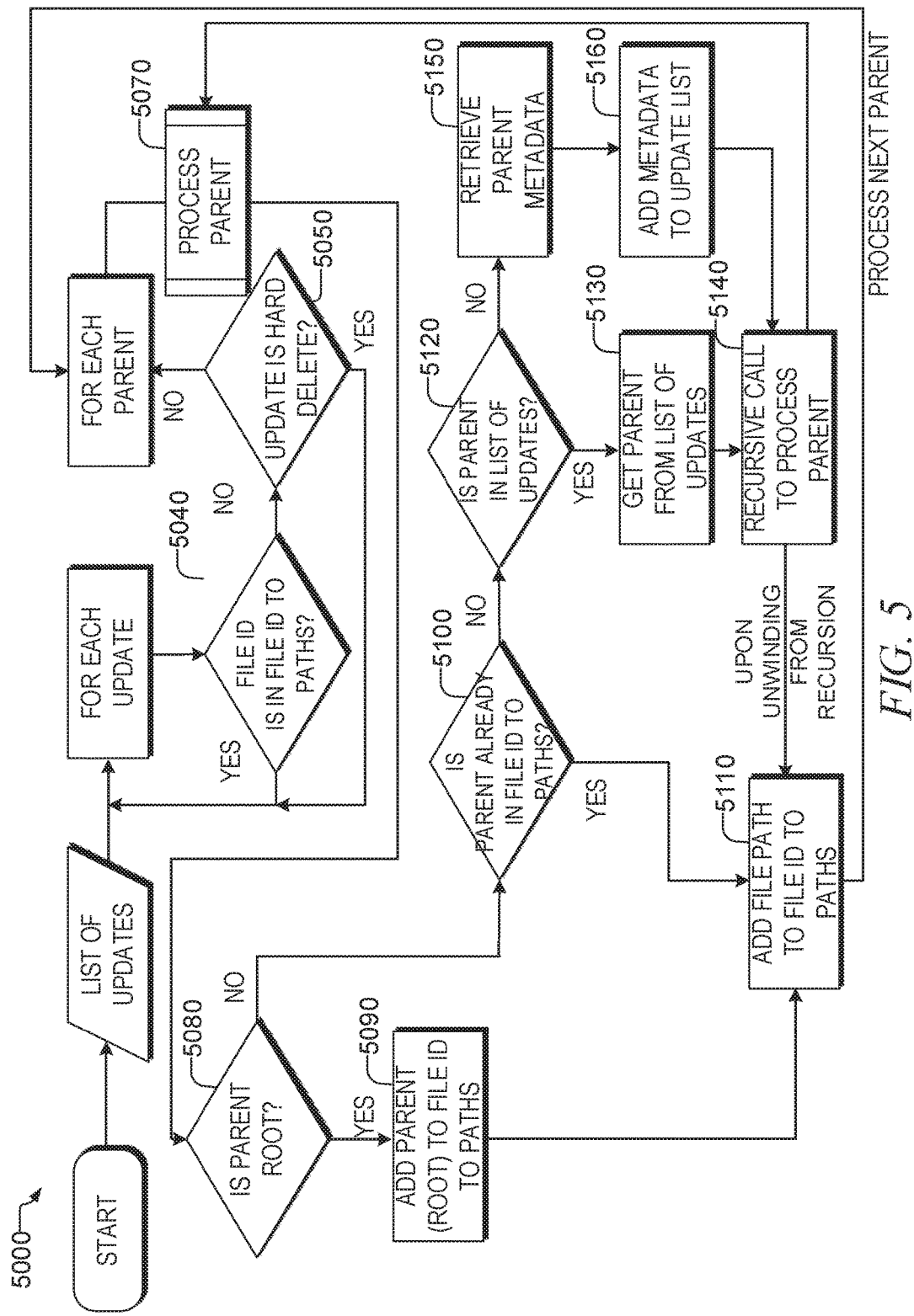
FIG. 5 is a flowchart of a method of determining file system element paths of respective file system elements in a list of changes sent by a network based file storage system in a first format based upon the file system element path information in a second format according to some examples of the present disclosure.

Turning now to FIG. 5, a flowchart of a method 5000 of determining system element paths of respective file system elements in a list of changes sent by a network based file storage system in a first format based upon the file system element path information in a second format according to some examples of the present disclosure. The method takes as input a list of updates, and for each respective update (or for a subset of the updates), the method performs operations 5040-5160. The list of changes comprise a unique identifier for the file system element that changed, a unique identifier of a parent file system element, the file system element name, a type of change e.g., add, delete, move), and other metadata about the file and/or the change. The method builds a mapping between unique file system element identifiers supplied by the network based file storage system and file system element paths of the archive and stores this in a data structure called File-Id-to-Paths. File-Id-to-Paths in some examples, is a multi-map of external (third party) file ids, to the path recognized by the archive service 1100. At operation 5040 the file system element identifier for the respective update is checked to determine if the file system element identifier is already in the File-Id-to-Paths data structure. If it is already in the File-Id-to-Paths data structure, nothing is done and processing moves to the next update in the list of updates.

If the file system element identifier is not already in the File-Id-to-Paths data structure, then at operation 5050 the update type is checked to determine if it is a hard delete. If it is a hard delete then nothing is done and the processing moves to the next update in the list of updates. This is because file system elements are not deleted from the archive. In some examples, even if the update is a hard delete, the path is determined so that the metadata of the file system element in the archive can be updated to reflect the delete. If the update is not a hard delete, for each parent (in some examples a file system element may have multiple pointers to multiple parent file system elements) the parent is processed in the process_parent subroutine 5070. At operation 5080, a check is made to determine if the unique identifier of the parent file system element is the unique identifier of the root of the network based file storage system for the user. If the parent is the root, the parent (and its corresponding unique id) are added to the File-Id-to-Paths structure at operation 5090 (if it is not already in the File-Id-to-Paths structure) and processing moves to operation 5110.

If the parent is not the root, a check is made at operation 5100 to determine whether the parent is in the File-Id-to-Paths structure. If the parent is already in the File-Id-to-Paths data structure, then the respective file system element from the respective update is added to the File-Id-to-Paths data structure as a full path. For example, if the update is [name:file system element2.txt; id: 121212 parent:111111] and parent is the root, then an entry of ["\file system element2.txt", 121212] is added. As another example, if the File-Id-to-Paths data structure has:
   ["\programfile system elements\newstuff\" 123456]
   ["\programfile system elements\" 111112]
Then an update of [name:file system element.txt; id: 78999 parent:123456] would return true at operation 5100 and then at operation 5110 the update would be stored as ["\programfile system elements\newstuff\file system element.txt" 78999] in the File-Id-to-Paths structure. Once operation 5110 is complete, processing moves to process the next parent (if any). Thus if a file system element has multiple parents, each parent will be processed similarly, potentially leading to multiple entries in the File-Id-to-Paths structure and multiple files in the archive.

If the parent is not already in the File-Id-to-Paths structure, then a check is made at operation 5120 to determine if the parent is later in the list of updates. If the parent is in the list of updates, then the parent's update is retrieved from the list of updates at operation 5130. A recursive call to process_parent is made passing in the parent update at operation 5140. If the parent is not in the list of updates, then at operation 5150, an RPC call is made to the network based file system element storage service to determine the metadata of the parent (e.g., the name, its parents, and the like). At operation 5160, this metadata is added to the update list as an update, and then a recursive call to process the parent is made at operation 5140. Once no more calls to process parent are made (e.g., parent is the root at operation 5080, or a parent is in the field to paths structure at operation 5100), the recursion begins to unwind. Each instance of process_parent then performs operation 5110, building the file system element path for each file system element or directory in the full path for a file system element.

Figure 6:
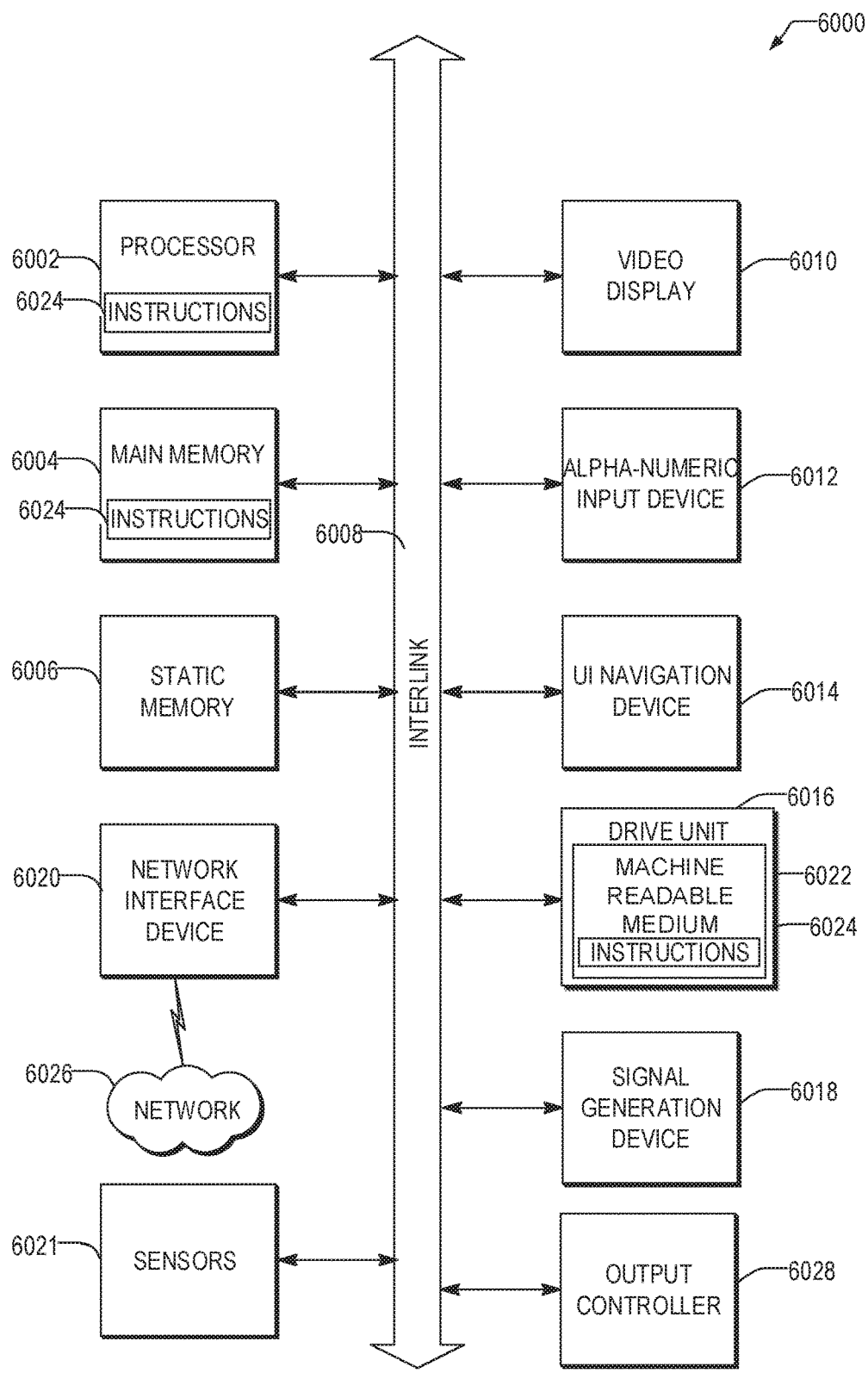
FIG. 6 is a block diagram illustrating an example of a machine upon which one or more embodiments may be implemented.

FIG. 6 illustrates a block diagram of an example machine 6000 upon which any one or more of the techniques (e.g., methodologies) discussed herein may perform. In alternative embodiments, the machine 6000 may operate as a stand-alone device or may be connected (e.g., networked) to other machines. Iii a networked deployment, the machine 6000 may operate in the capacity of a server machine, a client machine, or both in server-client network environments. In an example, the machine 6000 may act as a peer machine in peer-to-peer (P2P) (or other distributed) network environment. The machine 6000 may be a server computer, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 6000 may be specially programmed to include the components of monitoring service 1030 from FIG. 1, archive service 1100 of FIG. 1, clients 1018 and 1020 of FIG. 1, or network based file storage systems 1010-1016 of FIG. 1. Machine 6000 may be programmed to perform the operations of any one or more of FIGS. 2-5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms—hereinafter "modules." Modules are tangible entities (e.g., hardware) capable of performing specified operations and may be configured or arranged in a certain manner. In an example, circuits may be arranged (e.g., internally or with respect to external entities such as other circuits) a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 6000 may include a hardware processor 6002 (e.g., a central processing unit (CPU), a graphics processing unit (GPU), a hardware processor core, or any combination thereof), a main memory 6004 and a static memory 6006, some or all of which may communicate with each other via an interlink (e.g., bus) 6008. The machine 6000 may further include a display unit 6010, an alphanumeric input device 6012. (e.g., a keyboard), and a user interface (UI) navigation device 6014 (e.g., a mouse). In an example, the display unit 6010, input device 6012 and UI navigation device 6014 may be a touch screen display. The machine 6000 may additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 may include an output controller 6028, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 6016 may include a machine readable medium 6022 on which is stored one or more sets of data structures or instructions 6024 (e.g., software) embodying or utilized by any one or more of the techniques or functions described herein. The instructions 6024 may also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 may constitute machine readable media.

While the machine readable medium 6022 is illustrated as a single medium, the term "machine readable medium" may include a single medium or multiple media (e.g., a centralized or distributed database, and/or associated caches and servers) configured to store the one or more instructions 6024.

The term "machine readable medium" may include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 6024 may further be transmitted or received over a communications network 6026 using a transmission medium via the network interface device 6020. The Machine 6000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®) IEEE 802.15.4 family of standards, a Long Term Evolution (LTE) family of standards, a. Universal Mobile Telecommunications System (UMTS) family of standards, peer-to-peer (P2P) networks, among others. In an example, the network interface device 6020 may include one or more physical jacks (e.g., Ethernet, coaxial, or phone jacks) or one or more antennas to connect to the communications network 6026. In an example, the network interface device 6020 may include a plurality of antennas to wirelessly communicate using at least one of single-input multiple-output (SIMO), multiple-input multiple-output (MAIO), or multiple-input single-output (MISO) techniques. In some examples, the network interface device 6020 may wirelessly communicate using Multiple User MIMO techniques.

OTHER NOTES AND EXAMPLES

Example 1 is a computer implemented method of monitoring files in a network based file storage system, the method comprising: determining, over a network, from the network based file storage system, a list of changes to one or more file system elements stored on the network based file storage system; receiving, in response to the request, the list of changes; determining a first file path in a first format for a first file system element of the one or more file system elements corresponding to a change in the list of changes based upon second file path information in a second format corresponding to the change; modifying an archive in a data storage device using the first file path; and performing an audit of the file system element on the network based file storage using the archive.

In Example 2, the subject matter of Example 1 optionally includes, wherein modifying the archive comprises storing a copy of the first file system element in the archive at the first file path.

In Example 3, the subject matter of any one or more of Examples 1-2 optionally include, wherein modifying the archive comprises storing a copy of the first file system element at the first file path as a second version of the file system element along with a previous version of the file system element.

In Example 4, the subject matter of any one or more of Examples 1-3 optionally include, wherein the list of changes comprises, for each particular one of the set of one or more file system elements, a unique identifier for the particular one of the one or more file system elements and a unique identifier of a parent file system element in the network based file storage system.

In Example 5, the subject matter of Example 4 optionally includes, wherein determining a first file path in a first format for a first file system element of the one or more file system elements corresponding to a change in the list of changes based upon second file path information in a second format corresponding to the change comprises: executing a processing function to process metadata of an input file system element, the input file system element initially being the first file system element, the processing function: determining a parent file system element of the input file system element; recursively calling the processing function with the parent file system element of the input file system element as the input file system element until an input file system element has a parent that is a root of a file system of the network based file storage system or until an input file system element has a parent whose full path in the first format is known; and upon unwinding of the recursion, adding a name of the input file system element to a path, the path at each step of the unwinding being a full path of the input file system element in the first format, the path at the last unwinding being the first file path for the first file system element.

In Example 6, the subject matter of Example 5 optionally includes, wherein determining the parent file system element of the input file system element comprises: determining that the input file system element is included in the list of changes; and identifying a unique identifier of the parent file system element from metadata associated with the input file system element in the list of changes.

In Example 7, the subject matter of any one or more of Examples 5-6 optionally include, wherein determining the parent file system element of the input file system element comprises: determining that the input file system element is not included in the list of changes; and using a second request to request metadata associated with the input file system element, the metadata including a unique identifier of the parent file system element of the input file system element and the name of the input file system element.

In Example 8, the subject matter of any one or more of Examples 1-7 optionally include: periodically performing the steps of connecting, receiving, modifying and performing to store in the archive data structure changes to the first file system element of the one or more file system elements.

In Example 9, the subject matter of Example 8 optionally includes: requesting, over the network, from a second network based file storage system a second list of changes to one or more file system elements stored on the second network based file storage system; receiving a second list of changes to one or more file system elements stored on the second network based file storage system in response to the request; and modifying the archive with a change described in the second list of changes.

In Example 10, the subject matter of Example 9 optionally includes periodically performing the connecting, receiving, determining, modifying and performing to store in the archive any changes to file system elements corresponding to additional accounts of a plurality of additional users on the network based file storage systems and second network based file storage system.

In Example 11, the subject matter of Example 10 optionally includes, wherein performing the audit operation comprises: determining, based upon a fingerprint of a second file system element, which of the plurality of users has stored the second file system element on the network based file storage system or the second network based file storage system; and wherein the method comprises displaying in a graphical user interface (GUI) a list of the plurality of users that have stored the second file system element on either the network based file storage system or second network based file storage system.

In Example 12, the subject matter of Example 11 optionally includes, wherein displaying in a graphical user interface (GUI) a list of the plurality of users that have stored the second file system element on either the network based file storage system or second network based file storage system comprises providing a list of users that currently have the second file system element stored on either the network based file storage system or second network based file storage system.

In Example 13, the subject matter of any one or more of Examples 11-12 optionally include, wherein displaying in a graphical user interface (GUI) a list of the plurality of users that have stored the second file system element on either the network based file storage system or second network based file storage system comprises providing a list of users that have ever had the second file system element stored on either the network based file storage system or second network based file storage system.

In Example 14, the subject matter of any one or more of Examples 10-13 optionally include, wherein performing the audit operation comprises: determining, based upon a fingerprint of a second file system element, which of the plurality of users has stored a specified version of the second file system element on either the network based file storage system or second network based file storage system; and wherein the method comprises displaying in a graphical user interface (GUI) a list of the plurality of users that have stored the specified version of the second file system element on either the network based file storage system or second network based file storage system.

In Example 15, the subject matter of any one or more of Examples 10-14 optionally include: determining that a first user has a second file system element on the network based file storage system; determining that the first user is not an authorized user of the second file system element; and deleting the second file system element from the network based file storage system.

In Example 16, the subject matter of Example 15 optionally includes, wherein the first file system element and the second file system element are the same file system elements.

In Example 17, the subject matter of any one or more of Examples 1-16 optionally include, wherein determining over the network, from the network based file storage system, the list of changes to one or more file system elements stored on the network based file storage system comprises: requesting the list of changes from the network based file storage system.

In Example 18, the subject matter of any one or more of Examples 1-17 optionally include, wherein determining over the network, from the network based file storage system, the list of changes to one or more file system elements stored on the network based file storage system comprises: receiving a push notification containing the list of changes from the network based file storage system.

Example 19 is a non-transitory machine readable medium, comprising instructions, which when performed by the machine, cause the machine to perform the operations comprising: determining, over a network, from a network based file storage system, a list of changes to one or more file system elements stored on the network based file storage system; receiving, in response to the request; the list of changes; determining a first file path in a first format for a first file system element of the one or more file system elements corresponding to a change in the list of changes based upon second file path information in a second format corresponding to the change; modifying an archive in a data storage device using the first file path; and performing an audit of the file system element on the network based file storage using the archive.

In Example 20, the subject matter of Example 19 optionally includes, wherein the operations of modifying the archive comprises storing a copy of the first file system element in the archive at the first file path.

In Example 21, the subject matter of any one or more of Examples 19-20 optionally include, wherein the operations of modifying the archive comprises storing a copy of the first file system element at the first file path as a second version of the file system element along with a previous version of the file system element.

In Example 22, the subject matter of any one or more of Examples 19-21 optionally include, wherein the list of changes comprises, for each particular one of the set of one or more file system elements, a unique identifier for the particular one of the one or more file system elements and a unique identifier of a parent file system element in the network based file storage system.

In Example 23, the subject matter of Example 22 optionally includes, wherein the operations of determining a first file path in a first format for a first file system element of the one or more file system elements corresponding to a change in the list of changes based upon second file path information in a second format corresponding to the change comprises: executing a processing function to process metadata of an input file system element, the input file system element initially being the first file system element, the processing function: determining a parent file system element of the input file system element; recursively calling the processing function with the parent file system element of the input file system element as the input file system element until an input file system element has a parent that is a root of a file system of the network based file storage system or until an input file system element has a parent whose full path in the first format is known; and upon unwinding of the recursion, adding a name of the input file system element to a path, the path at each step of the unwinding being a full path of the input file system element in the first format; the path at the last unwinding being the first file path for the first file system element.

In Example 24, the subject matter of Example 23 optionally includes, wherein the operations of determining the parent file system element of the input file system element comprises: determining that the input file system element is included in the list of changes; and identifying a unique identifier of the parent file system element from metadata associated with the input file system element in the list of changes.

In Example 25, the subject matter of any one or more of Examples 23-24 optionally include, wherein the operations of determining the parent file system element of the input file system element comprises: determining that the input file system element is not included in the list of changes; and using a second request to request metadata associated with the input file system element; the metadata including a unique identifier of the parent file system element of the input file system element and the name of the input file system element.

In Example 26, the subject matter of any one or more of Examples 19-25 optionally include, wherein the operations comprise: periodically performing the steps of connecting, receiving, modifying and performing to store in the archive data structure changes to the first file system element of the one or more file system elements.

In Example 27, the subject matter of Example 26 optionally includes, wherein the operations comprise: requesting; over the network, from a second network based file storage system a second list of changes to one or more file system elements stored on the second network based file storage system; receiving a second list of changes to one or more file system elements stored on the second network based file storage system in response to the request; and modifying the archive with a change described in the second list of changes.

In Example 28, the subject matter of Example 27 optionally includes, wherein the operations comprise periodically performing the connecting, receiving, determining, modifying and performing to store in the archive any changes to file system elements corresponding to additional accounts of a plurality of additional users on the network based file storage systems and second network based file storage system.

In Example 29, the subject matter of Example 28 optionally includes, wherein the operations of performing the audit operation comprises: determining, based upon a fingerprint of a second file system element, which of the plurality of users has stored the second file system element on the network based file storage system or the second network based file storage system; and wherein the operations comprise displaying in a graphical user interface (GUI) a list of the plurality of users that have stored the second file system element on either the network based file storage system or second network based file storage system.

In Example 30, the subject matter of Example 29 optionally includes, wherein the operations of displaying in a graphical user interface (GUI) a list of the plurality of users that have stored the second file system element on either the network based file storage system or second network based file storage system comprises providing a list of users that currently have the second file system element stored on either the network based file storage system or second network based file storage system.

In Example 31, the subject matter of any one or more of Examples 29-30 optionally include, wherein the operations of displaying in a graphical user interface (GUI) a list of the plurality of users that have stored the second file system element on either the network based file storage system or second network based file storage system comprises providing a list of users that have ever had the second file system element stored on either the network based file storage system or second network based file storage system.

In Example 32, the subject matter of any one or more of Examples 28-31 optionally include, wherein the operations of performing the audit operation comprises: determining, based upon a fingerprint of a second file system element, which of the plurality of users has stored a specified version of the second file system element on either the network based file storage system or second network based file storage system; and wherein the operations comprise displaying in a graphical user interface (GUI) a list of the plurality of users that have stored the specified version of the second file system element on either the network based file storage system or second network based file storage system.

In Example 33, the subject matter of any one or more of Examples 28-32 optionally include; wherein the operations comprise: determining that a first user has a second file system element on the network based file storage system; determining that the first user is not an authorized user of the second file system element; and deleting the second file system element from the network based file storage system.

In Example 34, the subject matter of Example 33 optionally includes, wherein the first file system element and the second file system element are the same file system elements.

In Example 35, the subject matter of any one or more of Examples 19-34 optionally include, wherein the operations of determining over the network, from the network based file storage system, the list of changes to one or more file system elements stored on the network based file storage system comprises: requesting the list of changes from the network based file storage system.

In Example 36, the subject matter of any one or more of Examples 19-35 optionally include, wherein the operations of determining over the network, from the network based file storage system, the list of changes to one or more file system elements stored on the network based file storage system comprises: receiving a push notification containing the list of changes from the network based file storage system.

Example 37 is a system comprising: a processor; a memory, including instructions, which when performed by the processor causes the system to perform the operations comprising: determining, over a network, from a network based file storage system, a list of changes to one or more file system elements stored on the network based file storage system; receiving, in response to the request, the list of changes; determining a first file path in a first format for a first file system element of the one or more file system elements corresponding to a change in the list of changes based upon second file path information in a second format corresponding to the change; modifying an archive in a data storage device using the first file path; and performing an audit of the file system element on the network based file storage using the archive.

In Example 38, the subject matter of Example 37 optionally includes, wherein the operations of modifying the archive comprises storing a copy of the first file system element in the archive at the first file path.

In Example 39, the subject matter of any one or more of Examples 37-38 optionally include, wherein the operations of modifying the archive comprises storing a copy of the first file system element at the first file path as a second version of the file system element along with a previous version of the file system element.

In Example 40, the subject matter of any one or more of Examples 37-39 optionally include, wherein the list of changes comprises, for each particular one of the set of one or more file system elements, a unique identifier for the particular one of the one or more file system elements and a unique identifier of a parent file system element in the network based file storage system.

In Example 41, the subject matter of Example 40 optionally includes, wherein the operations of determining a first file path in a first format for a first file system element of the one or more file system elements corresponding to a change in the list of changes based upon second file path information in a second format corresponding to the change comprises: executing a processing function to process metadata of an input file system element, the input file system element initially being the first file system element, the processing function: determining a parent file system element of the input file system element; recursively calling the processing function with the parent file system element of the input file system element as the input file system element until an input file system element has a parent that is a root of a file system of the network based file storage system or until an input file system element has a parent whose full path in the first format is known; and upon unwinding of the recursion, adding a name of the input file system element to a path, the path at each step of the unwinding being a full path of the input file system element in the first format, the path at the last unwinding being the first file path for the first file system element.

In Example 42, the subject matter of Example 41 optionally includes, wherein the operations of determining the parent file system element of the input file system element comprises: determining that the input file system element is included in the list of changes; and identifying a unique identifier of the parent file system element from metadata associated with the input file system element in the list of changes.

In Example 43, the subject matter of any one or more of Examples 41-42 optionally include, wherein the operations of determining the parent file system element of the input file system element comprises: determining that the input file system element is not included in the list of changes; and using a second request to request metadata associated with the input file system element, the metadata including a unique identifier of the parent file system element of the input file system element and the name of the input file system element.

In Example 44, the subject matter of any one or more of Examples 37-43 optionally include, wherein the operations comprise: periodically performing the steps of connecting, receiving, modifying and performing to store in the archive data structure changes to the first file system element of the one or more file system elements.

In Example 45, the subject matter of Example 44 optionally includes, wherein the operations comprise: requesting, over the network, from a second network based file storage system a second list of changes to one or more file system elements stored on the second network based file storage system; receiving a second list of changes to one or more file system elements stored on the second network based file storage system in response to the request; and modifying the archive with a change described in the second list of changes.

In Example 46; the subject matter of Example 45 optionally includes, wherein the operations comprise periodically performing the connecting, receiving, determining, modifying and performing to store in the archive any changes to file system elements corresponding to additional accounts of a plurality of additional users on the network based file storage systems and second network based file storage system.

In Example 47, the subject matter of Example 46 optionally includes, wherein the operations of performing the audit operation comprises: determining, based upon a fingerprint of a second file system element, which of the plurality of users has stored the second file system element on the network based file storage system or the second network based file storage system; and wherein the operations comprise: displaying in a graphical user interface (GUI) a list of the plurality of users that have stored the second file system element on either the network based file storage system or second network based file storage system.

In Example 48, the subject matter of Example 47 optionally includes, wherein the operations of displaying in a graphical user interface (GUI) a list of the plurality of users that have stored the second file system element on either the network based file storage system or second network based file storage system comprises providing a list of users that currently have the second file system element stored on either the network based file storage system or second network based file storage system.

In Example 49, the subject matter of any one or more of Examples 47-48 optionally include, wherein the operations of displaying in a graphical user interface (GUI) a list of the plurality of users that have stored the second file system element on either the network based file storage system or second network based file storage system comprises providing a list of users that have ever had the second file system element stored on either the network based file storage system or second network based file storage system.

In Example 50, the subject matter of any one or more of Examples 46-49 optionally include, wherein the operations of performing the audit operation comprises: determining, based upon a fingerprint of a second file system element, which of the plurality of users has stored a specified version of the second file system element on either the network based file storage system or second network based file storage system; and wherein the operations comprise: displaying in a graphical user interface (GUI) a list of the plurality of users that have stored the specified version of the second file system element on either the network based file storage system or second network based file storage system.

In Example 51, the subject matter of any one or more of Examples 46-50 optionally include, wherein the operations comprise: determining that a first user has a second file system element on the network based file storage system; determining that the first user is not an authorized user of the second file system element; and deleting the second file system element from the network based file storage system.

In Example 52, the subject matter of Example 51 optionally includes, wherein the first file system element and the second file system element are the same file system elements.

In Example 53, the subject matter of any one or more of Examples 37-52 optionally include, wherein the operations of determining over the network, from the network based file storage system, the list of changes to one or more file system elements stored on the network based file storage system comprises: requesting the list of changes from the network based file storage system.

In Example 54, the subject matter of any one or more of Examples 37-53 optionally include, wherein the operations of determining over the network, from the network based file storage system, the list of changes to one or more file system elements stored on the network based file storage system comprises: receiving a push notification containing the list of changes from the network based file storage system.

What is claimed is:

1. A computer implemented method of monitoring files in a plurality of network based file storage systems, the method comprising:
    at a monitoring computing device:
        requesting user authorization to access a data archive associated with a user on the plurality of network based file storage systems;
        receiving the user authorization to access the data archive associated with the user on the plurality of network based file storage systems;
        periodically determining, over a network and using the authorization, from the plurality of network based file storage systems, information about changes to one or more file system elements stored on the plurality of network based file storage systems;
        monitoring a particular one of the one or more file system elements to determine an unauthorized access of the particular one of the one or more file system elements based upon the information about changes to the one or more file system elements;
        determining, based upon a fingerprint of the particular one of the one or more file system elements, a set of users that have stored the particular one of the one or more file system elements in a plurality of data archives, each of the data archives associated with a respective user of the set of users on the plurality of network based file storage systems; and
        responsive to deter mining an unauthorized access of the particular one of the one or more file system elements, providing a graphical user interface (GUI) with a list of the set of users and an indication that the unauthorized access occurred.

2. The method of claim 1, further comprising:
    determining a first file path in a first format, for a first file system element of the one or more file system elements that is indicated as having changed in the information about changes, the first file path based upon second file path information in a second format corresponding to a source network based file storage system of the plurality of network based file storage systems;
    modifying an archive in a data storage device managed by the monitoring computing device using the first file path; and
    storing a copy of the first file system element in the archive at the first file path.

3. The method of claim 2, wherein modifying the archive comprises storing a copy of the first file system element at the first file path as a second version of the file system element along with a previous version of the file system element.

4. The method of claim 2, wherein the information about changes comprises, for each particular one of the set of one or more file system elements, a unique identifier for the particular one of the one or more file system elements and a unique identifier of a parent file system element in the network based file storage system.

5. The method of claim 4, wherein determining the first file path in the first format for the first file system element of the one or more file system elements comprises:

executing a processing function to process metadata of an input file system element, the input file system element initially being the first file system element, the processing function:
  determining a parent file system element of the input file system element;
  recursively calling the processing function with the parent file system element of the input file system element as the input file system element until an input file system element has a parent that is a root of a file system of the network based file storage system or until an input file system element has a parent whose full path in the first format is known; and
  upon unwinding of the recursion, adding a name of the input file system element to a path, the path at each step of the unwinding being a full path of the input file system element in the first format, the path at the last unwinding being the first file path for the first file system element.

6. The method of claim 5, wherein determining the parent file system element of the input file system element comprises:
  determining that the input file system element is included in the information about changes; and
  identifying a unique identifier of the parent file system element from metadata associated with the input file system element in the information about changes.

7. The method of claim 5, wherein determining the parent file system element of the input file system element comprises:
  determining that the input file system element is not included in the information about changes; and
  using a second request to request metadata associated with the input file system element, the metadata including a unique identifier of the parent file system element of the input file system element and the name of the input file system element.

8. The method of claim 1, comprising:
  determining from a second network based file storage system second information about changes to one or more file system elements stored on the second network based file storage system;
  monitoring a second particular one of the one or more file system elements to determine an unauthorized access of the particular one of the one or more file system elements; and
  responsive to determining an unauthorized access of the second particular one of the one or more file system elements, providing a second indication in the GUI that the unauthorized access occurred.

9. The method of claim 1, wherein providing the graphical user interface (GUI) with the list of the set of users comprises providing a list of users that have ever had the particular one of the one or more file system elements stored at any time.

10. The method of claim 1, wherein determining the unauthorized access comprises:
  determining, based upon a fingerprint of a second file system element, which of a plurality of users has stored a specified version of the second file system element on either the network based file storage system or second network based file storage system; and
  wherein the method comprises displaying in a graphical user interface (GUI) a list of the plurality of users that have stored the specified version of the second file system element on either the network based file storage system or second network based file storage system.

11. The method of claim 1, comprising:
  responsive to determining the unauthorized access deleting the particular one of the one or more file system elements from the network based file storage system.

12. The method of claim 1, wherein determining over the network, and using the authorization, from the plurality of network based file storage systems, information about changes to one or more file system elements stored on the plurality of network based file storage systems comprises:
  requesting the information about the changes from a particular one of the plurality of network based file storage systems.

13. The method of claim 1, wherein determining over the network, and using the authorization, from the plurality of network based file storage systems, information about changes to one or more file system elements stored on the plurality of network based file storage systems comprises:
  receiving a push notification containing the list of changes from a particular one of the plurality of network based file storage systems.

14. A non-transitory machine readable medium, comprising instructions, which when performed by the machine, cause the machine to perform the operations comprising:
  at a monitoring computing device:
    requesting user authorization to access a data archive associated with a user on the plurality of network based file storage systems;
    receiving the user authorization to access the data archive associated with the user on the plurality of network based file storage systems;
    periodically determining, over a network and using the authorization, from the plurality of network based file storage systems, information about changes to one or more file system elements stored on the plurality of network based file storage systems;
    monitoring a particular one of the one or more file system elements to determine an unauthorized access of the particular one of the one or more file system elements based upon the information about changes to the one or more file system elements;
    determining, based upon a fingerprint of the particular one of the one or more file system elements, a set of users that have stored the particular one of the one or more file system elements in a plurality of data archives, each of the data archives associated with a respective user of the set of users on the plurality of network based file storage systems; and
    responsive to determining an unauthorized access of the particular one of the one or more file system elements, providing a graphical user interface (GUI) with a list of the set of users and an indication that the unauthorized access occurred.

15. The non-transitory machine readable medium of claim 14, wherein providing the graphical user interface (GUI) with the list of the set of users comprises providing a list of users that have ever had the particular one of the one or more file system elements stored at any time.

16. The non-transitory machine readable medium of claim 14, comprising:
  responsive to determining the unauthorized access deleting the particular one of the one or more file system elements from the network based file storage system.

17. A system comprising:

a processor;

a memory, including instructions, which when performed by the processor causes the system to perform the operations comprising:

at a monitoring computing device:

requesting user authorization to access a data archive associated with a user on the plurality of network based file storage systems;

receiving the user authorization to access the data archive associated with the user on the plurality of network based file storage systems;

periodically determining, over a network and using the authorization, from the plurality of network based file storage systems, information about changes to one or more file system elements stored on the plurality of network based file storage systems;

monitoring a particular one of the one or more file system elements to determine an unauthorized access of the particular one of the one or more file system elements based upon the information about changes to the one or more file system elements;

determining, based upon a fingerprint of the particular one of the one or more file system elements, a set of users that have stored the particular one of the one or more file system elements in a plurality of data archives, each of the data archives associated with a respective user of the set of users on the plurality of network based file storage systems; and responsive to determining an unauthorized access of the particular one of the one or more file system elements, providing a graphical user interface (GUI) with a list of the set of users and an indication that the unauthorized access occurred.

18. The system of claim 17, wherein providing the graphical user interface (GUI) with the list of the set of users comprises providing a list of users that have ever had the particular one of the one or more file system elements stored at any time.

19. The system of claim 17, further to perform operations comprising:

responsive to determining the unauthorized access deleting the particular one of the one or more file system elements from the network based file storage system.

* * * * *